US012782142B2

(12) United States Patent
Qureshi et al.

(10) Patent No.: US 12,782,142 B2
(45) Date of Patent: Nov. 3, 2026

(54) METHODOLOGY FOR REAL TIME CORRECTION AND ADAPTATION OF FILTER MODEL FOR ROBUST VEHICLE ODOMETRY

(71) Applicant: GM Global Technology Operations LLC, Detroit, MI (US)

(72) Inventors: Khizar Ahmad Qureshi, Pickering (CA); Matan Yeger, Pardes Hanna (IL); Mohammadali Shahriari, Markham (CA)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 38 days.

(21) Appl. No.: 18/795,623

(22) Filed: Aug. 6, 2024

(65) Prior Publication Data

US 2026/0043655 A1 Feb. 12, 2026

(51) Int. Cl.
*G01C 21/16* (2006.01)

(52) U.S. Cl.
CPC .................................. *G01C 21/188* (2020.08)

(58) Field of Classification Search
CPC .................................................... G01C 21/188
USPC .......................................................... 701/510
See application file for complete search history.

(56) References Cited

U.S. PATENT DOCUMENTS 6,647,352 B1 * 11/2003 Horton ................. G01C 21/188 702/151
7,418,364 B1 * 8/2008 Horton ................. G01C 21/188 702/153
2004/0073360 A1 * 4/2004 Foxlin .................. G01C 21/188 342/357.31
2004/0149036 A1 * 8/2004 Foxlin .................. G01C 21/166 702/94
2018/0052006 A1 * 2/2018 Ell ............................ G01P 5/00
2018/0188384 A1 * 7/2018 Ramanandan .......... G01S 19/47
2023/0097251 A1 * 3/2023 Adams ................... G01C 21/28 701/29.2

(Continued)

FOREIGN PATENT DOCUMENTS

CN 118089721 A * 5/2024 ............. G01S 19/42
DE 19632247 A1 * 2/1998 .............. G01P 3/489

(Continued)

OTHER PUBLICATIONS

X. Chen et al., "Adaptive-Reset Extended Kalman Filter Method for Subsynchronous Oscillation Monitoring," in IEEE Transactions on Power Electronics, vol. 39, No. 5, pp. 6163-6180, May 2024, doi: 10.1109/TPEL.2024.3365589. (Year: 2024).*

(Continued)

*Primary Examiner* — Erin D Bishop
*Assistant Examiner* — Keith A von Volkenburg
(74) *Attorney, Agent, or Firm* — Vivacqua Crane, PLLC

(57) ABSTRACT

A method for controlling a vehicle includes receiving input data. The input data includes sensor data from a plurality of sensors of a vehicle. The method further includes filtering the input data with a sliding window Extended Kalman Filter (EKF) to determine a heading and a position of the vehicle. Further, the method includes controlling the movement of the vehicle using the heading and the position of the vehicle determined using the sliding window EKF.

20 Claims, 2 Drawing Sheets

(56) References Cited

U.S. PATENT DOCUMENTS

| | | | | |
|---|---|---|---|---|
| 2023/0194265 | A1* | 6/2023 | Roumeliotis | G06T 7/70 701/472 |
| 2024/0385619 | A1* | 11/2024 | Kaufman | B60L 15/20 |
| 2025/0354830 | A1* | 11/2025 | Woo | G01C 22/00 |

FOREIGN PATENT DOCUMENTS

| | | | | | |
|---|---|---|---|---|---|
| JP | 2012131495 | A | * | 7/2012 | G01S 13/723 |
| WO | WO-2023237310 | A1 | * | 12/2023 | H04W 4/33 |

OTHER PUBLICATIONS

Carnegie Mellon University/Robomatter Inc. (2005). Wheels Diameter / Distance Traveled. http://cmra.rec.ri.cmu.edu/previews/rcx_products/robotics_educator_workbook/content/mech/pages/Diameter_Distance_TraveledTEACH.pdf (Year: 2005).*

Feng, Bo, et al. "Kalman filter with recursive covariance estimation—sequentially estimating process noise covariance." IEEE Transactions on Industrial Electronics 61.11 (2014): 6253-6263 (Year: 2014).*

Zhujie, Sha et al. "Vehicle State and Parameter Estimation Based on Improved Adaptive Dual Extended Kalman Filter with Variable Sliding Window." 2022 6th CAA International Conference on Vehicular Control and Intelligence (CVCI). IEEE, 2022. 1-6. Web. (Year: 2022).*

Luo, Jun et al. "Vehicle Platform Attitude Estimation Method Based on Adaptive Kalman Filter and Sliding Window Least Squares." Measurement science & technology 32.3 (2021): 35007. Web. (Year: 2021).*

Qingsong Xu, and Yangmin Li. "Sliding Mode Control of a Piezo-Driven Micropositioning System Using Extended Kalman Filter." 2010 IEEE International Conference on Automation and Logistics. IEEE, 2010. 427-432. Web. (Year: 2010).*

Cui, Xufei, et al. "Vehicle Heading Enhancement Based on Adaptive Sliding Window Factor Graph Optimization for Gyroscope/Magnetometer." IEEE Transactions on Instrumentation and Measurement 73 (2024): 1-14. (Year: 2024).*

S. Baek, C. Liu, p. Watta and Y. L. Murphey, "Accurate vehicle position estimation using a Kalman filter and neural network-based approach," 2017 IEEE Symposium Series on Computational Intelligence (SSCI), Honolulu, HI, USA, 2017, pp. 1-8, doi: 10.1109/SSCI.2017.8285360. (Year: 2017).*

* cited by examiner

METHODOLOGY FOR REAL TIME CORRECTION AND ADAPTATION OF FILTER MODEL FOR ROBUST VEHICLE ODOMETRY

INTRODUCTION

The present disclosure relates to methods and systems for real time correction and adaptation of filter model for robust vehicle odometry.

This introduction generally presents the context of the disclosure. Work of the presently named inventors, to the extent it is described in this introduction, as well as aspects of the description that may not otherwise qualify as prior art at the time of filing, are neither expressly nor impliedly admitted as prior art against this disclosure.

Some vehicles include Advanced Driver Assistance Systems (ADAS), such as Automatic Emergency Steering (AES), Automated Parking Assist (APA), etc. ADAS rely on odometry data to function properly. Odometry inaccuracies in position and heading estimation may cause a degraded performance of ADAS features. Memorizing long term correlation is a nature of adaptive filters which result in unwanted effects like drifting in position and heading even when the vehicle is stationary. This impact accumulates over time, increasing the overall error in estimation of vehicle odometry. It is therefore desirable to develop a system that considers these inaccuracies and provides a more accurate odometry result.

SUMMARY

The presently disclosed methodology uses a sliding window EKF to mitigate the inaccuracies described above. This is done through a systematic marginalization of selected odometry states from the estimated probability distribution. The detection of a sliding window event is based on measuring filter inputs, including wheel speed, wheel pulses inertial measurements and steering wheel input. This is done by adding an adaptive reset and relearn of covariances, progressive improvement to heading correction by employing statistical approach to account for potential sensor variation during operation The present disclosure describes a method for odometry estimation. The method includes receiving input data. The input data includes sensor data from a plurality of sensors of a vehicle. The method includes a wheel speed integrity check and a sensor information alignment. The method includes filtering the input data with a sliding window extended Kalman filter (EKF) to determine a heading and a position of the vehicle. The method described in this paragraph improves vehicle technology by providing accurate odometer data, thereby improving control of vehicle movements.

In an aspect of the present disclosure, the sensor data includes a wheel speed over time, and the plurality of sensors includes a wheel speed sensor. The sensor data includes a plurality of wheel pulses inertial measurements over time. The plurality of sensors includes an inertial measurement unit (IMU). The sensor data includes a plurality of steering angle measurements over time. The plurality of sensors includes a steering angle sensor. The method may include resetting specific entries in the covariance matrix (position and heading) to avoid unwanted long-term correlations. For odometry, only local environment is considered. The method further includes determining whether the distance accumulated by wheel pulses between a start time and an end time is greater than a distance threshold. The method includes resetting the covariance of the sliding window EKF in response to determining that the distance accumulated by the wheel pulses between the start time and the end time is greater than the distance threshold. The distance accumulated by the plurality of wheel pulses between the start time and the end time is determined using a following equation:

$$d_{whl}(t_s, t_e) = \frac{2 * \pi * R_{tire}}{N} * \Delta n(t_s, t_e)$$

where:

$t_s$ is a start time;

$t_e$ is an end time;

$d_{whl}(t_s,t_e)$ is the distance accumulated by the plurality of wheel pulses between the start time and the end time;

$R_{tire}$ is a radius of a tire of the vehicle;

$\pi$ is a ratio of a circle's circumference to its diameter;

N is a number of wheel pulses per revolution; and $\Delta n(t_s,t_e)$ are a number of wheel pulse increments between the start time $t_s$ and the end time $t_e$.

The new covariance matrix may be determined using a following equation:

$$P_{new} = (I - K * H) * P_{old}$$

$P_{new}$ is the new covariance matrix of the sliding window EKF;

$P_{old}$ is a previous covariance matrix of the sliding window EKF;

I is an innovation matrix;

K is a Kalman gain matrix; and

H is a measurement matrix.

The method includes determining whether a time elapsed from start time is equal to or greater than the end time. The method further includes, resetting the covariance of the sliding window EKF in response to determining the time elapsed from start time is equal to or greater than the end time.

The system includes a plurality of sensors and a controller in communication with the plurality of sensors. The controller is programmed to execute the method described above.

The present disclosure also describes a vehicle including a vehicle body, one or more sensors, and a controller in communication with the sensors. The sensors are coupled to the vehicle body. The controller may be programmed to execute the method described above.

Further areas of applicability of the present disclosure will become apparent from the detailed description provided below. It should be understood that the detailed description and specific examples are intended for purposes of illustration only and are not intended to limit the scope of the disclosure.

The above features and advantages, and other features and advantages, of the presently disclosed system and method are readily apparent from the detailed description, including the claims, and exemplary embodiments when taken in connection with the accompanying drawings.

BRIEF DESCRIPTION OF THE DRAWINGS

The present disclosure will become more fully understood from the detailed description and the accompanying drawings, wherein.

DETAILED DESCRIPTION

Figure 1:
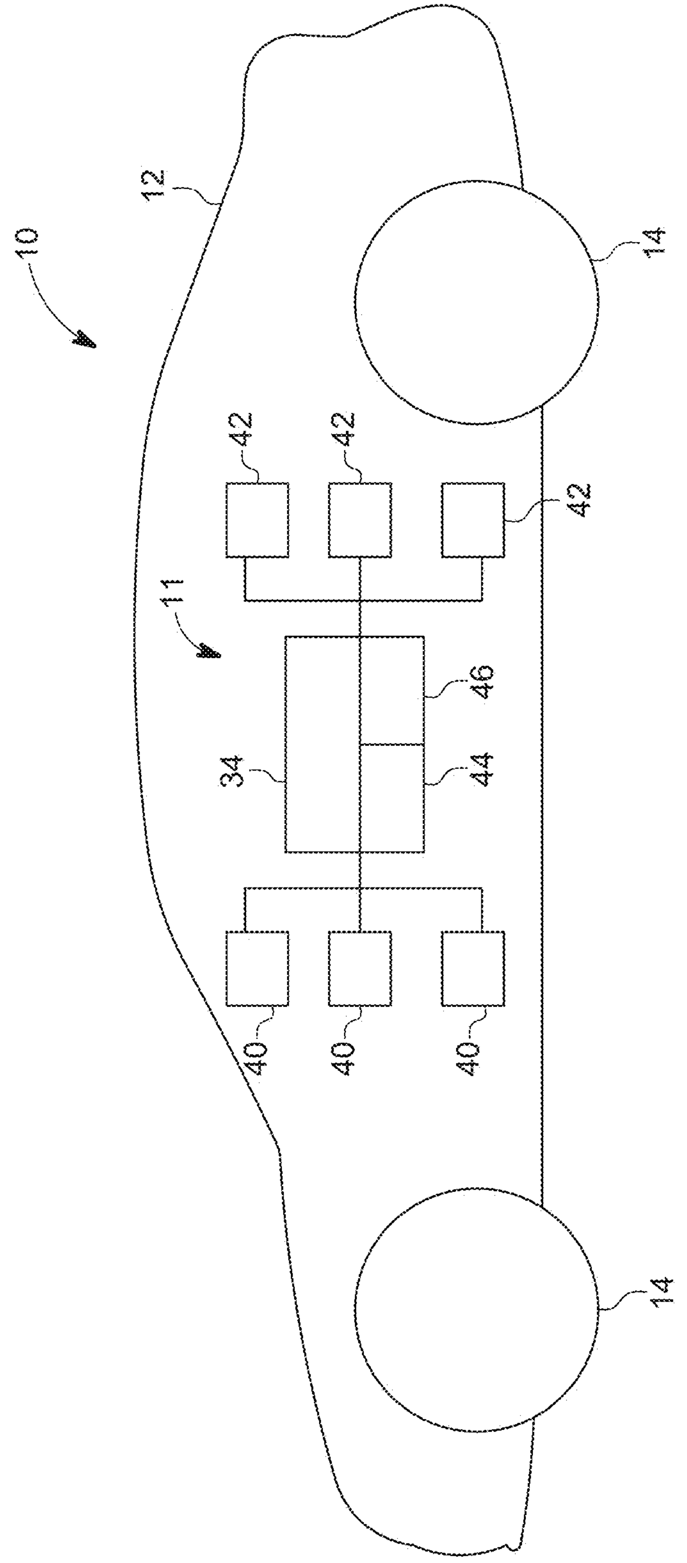
FIG. 1 is a schematic side view of a vehicle including a system for controlling the movement of the vehicle.

Reference will now be made in detail to several examples of the disclosure that are illustrated in accompanying drawings. Whenever possible, the same or similar reference numerals are used in the drawings and the description to refer to the same or like parts or steps.

With reference to FIG. 1, a vehicle 10 includes (or is in communication with) a system 11 for controlling the movements of the vehicle 10. Although the vehicle 10 is shown as a coupe, it is envisioned that that vehicle 10 may be another type of vehicle, such as a pickup truck, a sedan, a sport utility vehicle (SUVs), a recreational vehicle (RVs), etc. The system 11 can be used for accurate estimation of the odometry of the vehicle 10. The vehicle includes a vehicle body 12 and one or more wheels 14 coupled to the vehicle body 12.

Further, the vehicle 10 includes a vehicle controller 34 coupled to the vehicle body 12 and one or more sensors 40 in communication with the vehicle controller 34. The sensors 40 are coupled to the vehicle body 12 and collect information and generate sensor data indicative of the collected information. As non-limiting examples, the sensors 40 may include inertial measurement unit (IMU), yaw rate sensors, ride height sensors, wheel speed sensors, lidars, radars, ultrasonic sensors, and cameras, among others. The GNSS transceivers or receivers are configured to detect the location of the vehicle 10 in the globe. The speed sensors are configured to detect the speed of the vehicle 10. The yaw rate sensors are configured to determine the heading of the vehicle 10. The cameras may have a field of view large enough to capture images in front, in the rear, and in the sides of the vehicle 10. The ride height sensors are configured to measure the right height of the vehicle 10. The ultrasonic sensor may detect static and/or dynamic objects.

The vehicle controller 34 is programmed to receive sensor data from the sensors 40 and includes at least one processor 44 and a non-transitory computer readable storage device or media 46. The processor 44 may be a custom-made processor, a central processing unit (CPU), a graphics processing unit (GPU), an auxiliary processor among several processors associated with the vehicle controller 34, a semiconductor-based microprocessor (in the form of a microchip or chip set), a macroprocessor, a combination thereof, or generally a device for executing instructions. The computer readable storage device or media 46 may include volatile and nonvolatile storage in read-only memory (ROM), random-access memory (RAM), and keep-alive memory (KAM), for example. KAM is a persistent or non-volatile memory that may be used to store various operating variables while the processor 44 is powered down. The computer-readable storage device or media of the vehicle controller 34 may be implemented using a number of memory devices such as PROMs (programmable read-only memory), EPROMs (electrically PROM), EEPROMs (electrically erasable PROM), flash memory, or another electric, magnetic, optical, or combination memory devices capable of storing data, some of which represent executable instructions, used by the vehicle controller 34 in controlling the vehicle 10.

The instructions may include one or more separate programs, each of which comprises an ordered listing of executable instructions for implementing logical functions. The instructions, when executed by the processor 44, receive and process signals from the cameras, perform logic, calculations, methods and/or algorithms for automatically controlling the components of the vehicle 10, and generate control signals to the actuators to automatically control the components of the vehicle 10 based on the logic, calculations, methods, and/or algorithms. Although a single vehicle controller 34 is shown in FIG. 1, the system 11 may include a plurality of controllers 34 that communicate over a suitable communication medium or a combination of communication mediums and that cooperate to process the sensor signals, perform logic, calculations, methods, and/or algorithms, and generate control signals to automatically control features of the system 11. In various embodiments, one or more instructions of the vehicle controller 34 are embodied in the system 11. The non-transitory computer readable storage device or media 46 includes machine-readable instructions (shown, for example, in FIG. 2), that when executed by the one or more processors, cause the processors 44 to execute the method 100 (FIG. 2).

The vehicle 10 further includes one or more vehicle actuators 42 that control one or more vehicle features such as, but not limited to, the propulsion system, the transmission system, accelerator pedal, brake pedal, the electronic power steering system 45, and the brake system. As non-limiting examples, the vehicle actuators 42 may be the electronic power steering system 45. The electronic power steering system 45 includes an electric motor 43 to control the steering of the vehicle 10. The vehicle actuators 42 are in communication with the vehicle controller 34. Therefore, the vehicle controller 34 is programmed to control the operation of the vehicle actuators 47. For instance, the vehicle controller 34 is programmed to control the operation of the electric motor 43 of the electronic power steering system 45 to control the steering of the vehicle 10.

Figure 2:
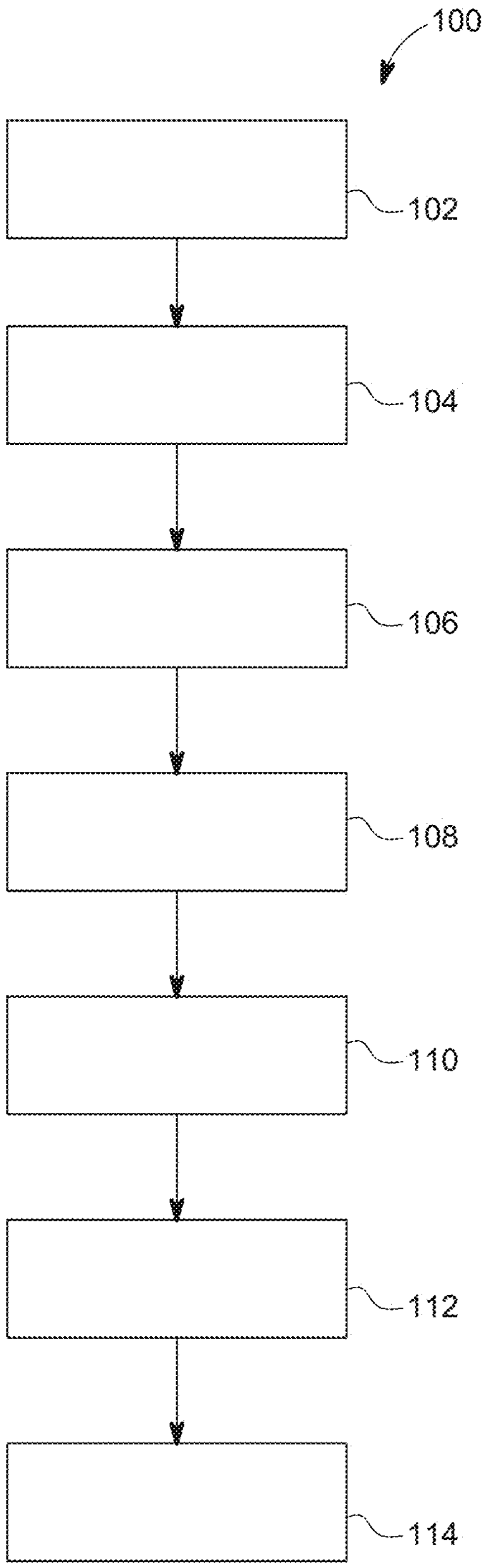
FIG. 2 is a flowchart of a method for controlling the movements of the vehicle.

FIG. 2 is a flowchart of a method 100 for determining the odometry of the vehicle 1S0. The method 100 entails a sliding window EKF that aims at adapting the covariance systematically at given instances and updating the accumulated information to ensure correction is propagated backwards. The method 100 begins at block 102. At block 102, the controller 34 receives input data or inputs. The input data includes real-time sensor data from the sensors 40. As non-limiting examples, the input data includes wheel speed from the wheel speed over time, steering angle measurements over time from the steering angle sensor, rear steering measurements over time from the active rear steering, wheel pulses inertial measurements over time from the inertial measurement unit (IMU), global navigation satellite system (GNSS) data from the GNSS transceiver, and data from a communication gateway module. Then, the method 100 continues to block 104. Block entails a wheel speed integrity check and a sensor information alignment. Further, at block 104, the controller 34 decides whether to perform a systematic reset of the covariance of the sliding window EKF based on a time and a distance accumulated by a plurality of wheel pulses. To do so, the controller 34 employs a fault and integrity monitor. The fault and integrity monitor may check the sensor data originating from each of the wheels 14 against each other. This check can be used to remove outliers and correct wheel sensor data. The per wheel average longitudinal velocity may be calculated as follows:

$$u(t_1, t_2) = k * \frac{n(t_2) - n(t_1)}{t_2 - t_1} = k * \frac{\Delta_n}{\Delta_t}$$

$t_1$ is a first point in time when a sensor measurement is received;

$t_2$ is a second point in time point when a measurement is received;

k is a distance per pulse factor;

where u is the longitudinal velocity;

$n(t_2)$ is the number of wheel pulses received at time $t_2$;

$n(t_1)$ is the number of wheel pulses received at time $t_1$;

$\Delta_n$ is the difference between $n(t_2)$ and $n(t_1)$;

$\Delta_t$ is the difference between $t_2$ and $t_1$.

To compare the wheel average velocities, these velocities are transformed to the rear axle as follows:

$$u_{raxle} = u * \cos(\delta_s) - \omega_z * l_{d2r}$$

Where:

$u_{raxle}$ is the speed of each wheel 14 at the rear axle;

$\delta_s$ is road wheel angle of each wheel;

$\omega_z$ is the yaw rate of the vehicle 10; and $l_{d2}r$ is the distance from the corresponding wheel 14 to the rear axle.

Different wheels sensor readings are received at different times. To compensate for potential difference between sensor readings, the average velocity is extrapolated using linear longitudinal acceleration. Extrapolation ensures that at any given time, all the speed information is aligned by combining the extrapolated information and the new sensor information. The average velocity may be extrapolated using the following equations:

$$u_{raxle}(t + \Delta t) = u_{raxle}(t) + a_{x_{linear}} * \Delta t$$

where:

$u_{raxle}$ is the speed of each wheel 14 at the rear axle;

$\Delta t$ is a predetermined time increment;

t is a specific point in time when a sensor measurement is received;

$a_{x_{linear}}$ is linear acceleration;

$$a_{x_{linear}} = a_x^{IMU} + \hat{b}_{a_{x_{linear}}} + g * \sin(\theta) - \omega_z^2 * l_{i2r} + \omega_z * u$$

where:

u is the speed of each wheel 14 at the rear axle;

$$a_{x_{linear}}$$

is linear acceleration;

$$\hat{b}_{a_{x_{linear}}}$$

is the bias of the IMU;

$$a_x^{IMU}$$

is the sensor reading (i.e., longitudinal acceleration) of the IMU;

g is the gravitational constant;

$\theta$ is road bank;

$l_{i2r}$ is distance from the IMU to rear axle of the vehicle 10; and $\omega_z$ is the yaw rate of the vehicle 10.

Large inconsistencies are compared to an assumed accuracy as follows:

$$\frac{|u_{raxle_1} - u_{raxle_2}|}{\sqrt{(\sigma_{whl_1}^2 + \sigma_{whl_2}^2)u_{raxle_2}|}} > T_{whl}$$

where:

$u_{raxle_1}$ is the speed of a first wheel 14 at the rear axle;

$u_{raxle_2}$ is the speed of a second wheel 14 at the rear axle;

$\sigma_{whl1}$ is the standard deviation of the wheel speed sensor at the first wheel 14 at the rear axle;

$\sigma_{whl2}$ is the standard deviation of the wheel speed sensor at the second wheel 14 at the rear axle;

$T_{whl}$ is the threshold for determining wheel consistency based on the assumed accuracy of the wheel speed sensor measurements.

Then, the method 100 continues to block 106. At block 106, the controller 34 monitors the distance travelled by the vehicle 10 since the last reset. The covariance is reset based on the time and distance accumulated by wheel pulses. If distance calculated per wheel between the start of accumulation and the end of accumulation exceeds the set criteria, the controller 34 triggers a covariance reset. If the distance criteria are not met, the reset will occur after end of accumulation time. The distance from wheel pulses can be observed by tracking the number of wheel pulses detected by the wheel speed sensor over a period time and may be calculated using the following equation:

$$d_{whl}(t_s, t_e) = \frac{2 * \pi * R_{tire}}{N} * \Delta n(t_s, t_e)$$

where:

$t_s$ is the start time or the start of accumulation time;

$t_e$ is the end time or the end of accumulation time;

$d_{whl}(t_s, t_e)$ is the distance accumulated by the plurality of wheel pulses between the start time and the end time;

$R_{tire}$ is a radius of a tire of the vehicle;

$\pi$ is a ratio of a circle's circumference to its diameter;

N is a number of wheel pulses per revolution; and $\Delta n(t_s,t_e)$ are a number of wheel pulse increments between the start time $t_s$ and the end time $t_e$.

Then, the method 100 continues to block 106. At block 106, the controller 34 determines the total time elapsed since the last reset. If the total time elapsed since the last reset is equal to or less than a predetermined amount of time, then no reset is performed. If the total time since the last reset is greater than the predetermined amount of time, then the controller 34 performs a reset. At block 104, the controller 34 considers the conditions discovered at blocks 106 and 108 to determine whether a reset should be performed. Then, the method 100 continues to block 110.

At block 110, the controller 34 performs a covariance marginalization. In other words, once the covariance reset conditions are met, the covariance matrix of the sliding window EKF is reset. To do so, the controller 34 may use the following equations:

$$K = P_{old} * H^T * S^{-1}$$

$$\delta\hat{x} = \delta\hat{x} + K * \overline{y}$$

$$P_{new} = (I - K * H) * P_{old}$$

where:

$P_{new}$ is the new covariance matrix of the sliding window EKF;

$P_{old}$ is a previous covariance matrix of the sliding window EKF;

I is an innovation matrix;

K is the Kalman gain matrix; and

H is the measurement matrix;

K is the Kalman gain matrix;

H is the measurement matrix;

S is the measurement residual covariance matrix that represents uncertainty of the measurement prediction;

$\overline{y}$ is the innovation vector; and $\delta\hat{x}$ is the state correction vector which is added to the previous state estimation to obtain the updated state estimate.

Once the covariance matrix is reset, the method 100 continues to block 112. At block 112, the controller 34 filters the input data at (received at block 102) with the sliding window Extended Kalman Filter (EKF) using the reset covariance matrix to determine the real-time odometry (i.e., the heading and the position) of the vehicle 10. Then, the method 100 continues to block 114.

At block 114, the controller 34 feeds the odometry to one or more ADAS features, such as AES and APA). Thus, at block 114, the controller 34 may control the movement of the vehicle 10 using the heading and the position (i.e., odometry) of the vehicle 10 determined using the sliding window EKF.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the presently disclosed system and method that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

The drawings are in simplified form and are not to precise scale. For purposes of convenience and clarity only, directional terms such as top, bottom, left, right, up, over, above, below, beneath, rear, and front, may be used with respect to the drawings. These and similar directional terms are not to be construed to limit the scope of the disclosure in any manner.

Embodiments of the present disclosure are described herein. It is to be understood, however, that the disclosed embodiments are merely examples and other embodiments can take various and alternative forms. The figures are not necessarily to scale; some features could be exaggerated or minimized to display details of particular components. Therefore, specific structural and functional details disclosed herein are not to be interpreted as limiting, but merely as a representative basis for teaching one skilled in the art to variously employ the presently disclosed system and method. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Embodiments of the present disclosure may be described herein terms of functional and/or logical block components and various processing steps. It should be appreciated that such block components may be realized by a number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with a number of systems, and that the systems described herein are merely exemplary embodiments of the present disclosure.

For the sake of brevity, techniques related to signal processing, data fusion, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that alternative or additional functional relationships or physical connections may be present in an embodiment of the present disclosure.

This description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims.

What is claimed is:

1. A method for odometry estimation comprising:

receiving input data, wherein the input data includes vehicle sensor data from a plurality of sensors of a vehicle and environment sensor data from an environment;

checking wheel sensor data of the vehicle sensor data originating from each of a plurality of wheels of the vehicle against each other to correct the wheel sensor data by determining a per wheel average longitudinal velocity of each of the plurality of wheels based on the following equation:

$$u(t_1, t_2) = k * \frac{n(t_2) - n(t_1)}{t_2 - t_1} = k * \frac{\Delta_n}{\Delta_t}$$

where:

$t_1$ is a first point in time when a sensor measurement of the wheel sensor data originating from each of the plurality of wheels is received;

$t_2$ is a second point in time point when the sensor measurement of the wheel sensor data originating from each of the plurality of wheels is received;

k is a distance per pulse factor;

where u is a longitudinal velocity;

$n(t_2)$ is a number of wheel pulses received at time $t_2$;

$n(t_1)$ is a number of wheel pulses received at time $t_1$;

$\Delta n$ is the difference between $n(t_2)$ and $n(t_1)$; and $\Delta_t$ is the difference between $t_2$ and $t_1$;

transforming each per wheel average longitudinal velocity into a corresponding rear axle speed of the vehicle based on the following equation:

$$u_{raxle} = u * \cos(\delta_s) - \omega_z * l_{d2r}$$

where:

$u_{raxle}$ is a speed of each wheel at the rear axle;

$\delta_s$ is a road wheel angle of each wheel;

$\omega_z$ is a yaw rate of the vehicle; and $l_{d2r}$ is the distance from the corresponding wheel to the rear axle;

determining a linear longitudinal acceleration of the wheel sensor data originating from each of the plurality of wheels to compensate for differences between receiving the input data, including the vehicle sensor data from each of the plurality of sensors, based on the following equations:

$$u_{raxle}(t + \Delta t) = u_{raxle}(t) + a_{x_{linear}} * \Delta t$$

where:

$$u_{raxle}$$

is the speed of each of the plurality of wheels at the rear axle;

$\Delta t$ is a predetermined time increment;

t is a specific point in time when the sensor measurement of the wheel sensor data originating from each of the plurality of wheels is received;

$a_{x_{linear}}$ is a linear acceleration of each of the plurality of wheels; and $$a_{x_{linear}} = a_x^{IMU} + \hat{b}_{a_{x_{linear}}} + g * \sin(\theta) - \omega_z^2 * l_{i2r} + \omega_z * \underline{u_{raxle}}$$

where:

$u_{raxle}$ is the speed of each wheel at the rear axle;

$a_{x_{linear}}$ is linear acceleration of each of the plurality of wheels;

$$\hat{b}_{a_{x_{linear}}}$$

is the bias of an inertial measurement unit (IMU) of the plurality of sensors;

$$a_x^{IMU}$$

is a sensor reading of the IMU;

g is the gravitational constant;

$\theta$ is a road bank;

$l_{i2r}$ is a distance from the IMU of the vehicle to the rear axle; and $\omega_z$ is the yaw rate of the vehicle;

filtering the input data, including the corrected wheel sensor data, with a sliding window Extended Kalman Filter (EKF) to determine a heading and a position of the vehicle; and controlling the movement of the vehicle using the heading and the position of the vehicle determined using the sliding window EKF.

2. The method of claim 1, wherein the wheel sensor data includes a wheel speed over time, and the plurality of sensors includes a wheel speed sensor that measures wheel speed sensor data of the wheel sensor data.

3. The method of claim 2, wherein the wheel sensor data includes a plurality of wheel pulses inertial measurements over time.

4. The method of claim 3, wherein the vehicle sensor data includes a plurality of steering angle measurements over time, and the plurality of sensors includes a steering angle sensor.

5. The method of claim 4, further comprising adjusting, adapting or resetting a covariance of the sliding window EKF based on a time and a distance accumulated by a plurality of wheel pulses.

6. The method of claim 5, further determining:

determining whether the distance accumulated by wheel pulses between a start time and an end time is greater than a distance threshold; and in response to determining that the distance accumulated by the wheel pulses between the start time and the end time is greater than the distance threshold, adjusting, adapting or resetting the covariance of the sliding window EKF.

7. The method of claim 6, wherein the distance accumulated by the plurality of wheel pulses between the start time and the end time is determined using a following equation:

$$d_{whl}(t_s, t_e) = \frac{2 * \pi * R_{tire}}{N} * \Delta n(t_s, t_e)$$

where:

$t_s$ is a start time;

$t_e$ is an end time;

$d_{whl}(t_s, t_e)$ is the distance accumulated by the plurality of wheel pulses between the start time and the end time;

$R_{tire}$ is a radius of a tire of the vehicle;

$\pi$ is a ratio of a circle's circumference to its diameter;

N is a number of wheel pulses per revolution; and $\Delta n(t_s, t_e)$ are a number of wheel pulse increments between the start time $t_s$ and the end time $t_e$.

8. The method of claim 7, wherein resetting the covariance of the sliding window EKF comprising includes determining a new covariance matrix using a following equation:

$$P_{new}=(I-K*H)*P_{old}$$

$P_{new}$ is the new covariance matrix of the sliding window EKF;

$P_{old}$ is a previous covariance matrix of the sliding window EKF;

I is an innovation matrix;

K is a Kalman gain matrix; and

H is a measurement matrix.

9. The method of claim 8, further comprising:

determining whether a time elapsed from start time is equal to or greater than the end time; and in response to determining the time elapsed from start time is equal to or greater than the end time, resetting the covariance of the sliding window EKF.

10. A system for controlling a vehicle, comprising:

a plurality of sensors including an inertial measurement unit (IMU);

a controller in communication with the plurality of sensors, wherein the controller is programmed to:

receive input data, wherein the input data includes vehicle sensor data from a plurality of sensors of a vehicle and environment sensor data from an environment;

check wheel sensor data of the vehicle sensor data originating from each of a plurality of wheels of the vehicle against each other to correct the wheel sensor data by determining a per wheel average longitudinal velocity of each of the plurality of wheels based on the following equation:

$$u(t_1,t_2)=k*\frac{n(t_2)-n(t_1)}{t_2-t_1}=k*\frac{\Delta_n}{\Delta_t}$$

where:

$t_1$ is a first point in time when a sensor measurement of the wheel sensor data originating from each of the plurality of wheels is received;

$t_2$ is a second point in time point when the sensor measurement of the wheel sensor data originating from each of the plurality of wheels is received;

k is a distance per pulse factor;

where u is a longitudinal velocity;

$n(t_2)$ is a number of wheel pulses received at time $t_2$;

$n(t_1)$ is a number of wheel pulses received at time $t_1$;

$\Delta n$ is the difference between $n(t_2)$ and $n(t_1)$; and $\Delta t$ is the difference between $t_2$ and $t_1$;

transform each per wheel average longitudinal velocity into a corresponding rear axle speed of the vehicle based on the following equation:

$$u_{raxle}=u*\cos(\delta_s)-\omega_z*l_{d2r}$$

where:

$u_{raxle}$ is a speed of each wheel at the rear axle;

$\delta_s$ is a road wheel angle of each wheel;

$\omega_z$ is a yaw rate of the vehicle; and $l_{d2r}$ is the distance from the corresponding wheel to the rear axle;

determine a linear longitudinal acceleration of the wheel sensor data originating from each of the plurality of wheels to compensate for differences between receiving the input data, including the vehicle sensor data from each of the plurality of sensors, based on the following equations:

$$u_{raxle}(t+\Delta t)=u_{raxle}(t)+a_{x_{linear}}*\Delta t$$

where:

$u_{raxle}$ is the speed of each of the plurality of wheels at the rear axle;

$\Delta t$ is a predetermined time increment;

t is a specific point in time when the sensor measurement of the wheel sensor data originating from each of the plurality of wheels is received;

$a_{x_{linear}}$ is a linear acceleration of each of the plurality of wheels; and $$a_{x_{linear}}=a_x^{IMU}+\hat{b}_{a_{x_{linear}}}+g*\sin(\theta)-\omega_z^2*l_{i2r}+\omega_z*\underline{u_{raxle}}$$

where:

$$u_{raxle}$$

is the speed of each wheel at the rear axle;

$a_{x_{linear}}$ is linear acceleration of each of the plurality of wheels;

$$\hat{b}_{a_{x_{linear}}}$$

is the bias of the IMU;

$$a_x^{IMU}$$

is a sensor reading of the IMU;

g is the gravitational constant;

$\theta$ is a road bank;

$l_{izr}$ is a distance from the IMU of the vehicle to the rear axle; and $\omega_z$ is the yaw rate of the vehicle;

filter the input data, including the corrected wheel sensor data, with a sliding window Extended Kalman Filter (EKF) to determine a heading and a position of the vehicle; and control a movement of the vehicle using the heading and the position of the vehicle determined using the sliding window EKF.

11. The system of claim 10, wherein the wheel sensor data includes a wheel speed over time, and the plurality of sensors includes a wheel speed sensor that measures wheel speed sensor data of the wheel sensor data.

12. The system of claim 11, wherein the wheel sensor data includes a plurality of wheel pulses inertial measurements over time.

13. The system of claim 12, wherein the vehicle sensor data includes a plurality of steering angle measurements over time, and the plurality of sensors includes a steering angle sensor.

14. The system of claim 13, wherein the controller is programmed to adjusting, adapting or reset a covariance of the sliding window EKF based on a time and a distance accumulated by wheel pulses.

15. The system of claim 14, wherein the controller is programmed to:

determine whether the distance accumulated by wheel pulses between a start time and an end time is greater than a distance threshold; and in response to determining that the distance accumulated by a plurality of wheel pulses between the start time and the end time is greater than the distance threshold, reset the covariance of the sliding window EKF.

16. The system of claim 15, wherein the distance accumulated by the plurality of wheel pulses between the start time and the end time is determined using a following equation:

$$d_{whl}(t_s, t_e) = \frac{2 * \pi * R_{tire}}{N} * \Delta n(t_s, t_e)$$

where:

$t_s$ is a start time;

$t_e$ is an end time;

$d_{whl}(t_s,t_e)$ is the distance accumulated by the plurality of wheel pulses between the start time and the end time;

$R_{tire}$ is a radius of a tire of the vehicle;

π is a ratio of a circle's circumference to its diameter;

N is a number of wheel pulses per revolution; and $\Delta n(t_s, t_e)$ are a number of wheel pulse increments between the start time $t_s$ and the end time $t_e$.

17. The system of claim 16, wherein resetting the covariance of the sliding window EKF comprising includes determining a new covariance matrix using a following equation:

$$P_{new} = (I - K * H) * P_{old}$$

$P_{new}$ is the new covariance matrix of the sliding window EKF;

$P_{old}$ is a previous covariance matrix of the sliding window EKF;

I is an innovation matrix;

K is a Kalman gain matrix; and

H is a measurement matrix.

18. The system of claim 17, wherein the controller is programmed to:

determine whether a time elapsed from start time is equal to or greater than the end time; and in response to determining the time elapsed from start time is equal to or greater than the end time, reset the covariance of the sliding window EKF.

19. A method for controlling a vehicle, comprising:

receiving input data, wherein the input data includes vehicle sensor data from a plurality of sensors of a vehicle and global navigation satellite system (GNSS) data from a GNSS transceiver;

checking wheel sensor data of the vehicle sensor data originating from each of a plurality of wheels of the vehicle against each other to correct the wheel sensor data by determining a per wheel average longitudinal velocity of each of the plurality of wheels based on the following equation:

$$u(t_1, t_2) = k * \frac{n(t_2) - n(t_1)}{t_2 - t_1} = k * \frac{\Delta_n}{\Delta_t}$$

where:

$t_1$ is a first point in time when a sensor measurement of the wheel sensor data originating from each of the plurality of wheels is received;

$t_2$ is a second point in time point when the sensor measurement of the wheel sensor data originating from each of the plurality of wheels is received;

k is a distance per pulse factor;

where u is a longitudinal velocity;

$n(t_2)$ is a number of wheel pulses received at time $t_2$;

$n(t_1)$ is a number of wheel pulses received at time $t_1$;

$\Delta_n$ is the difference between $n(t_2)$ and $n(t_1)$; and $\Delta_t$ is the difference between $t_2$ and $t_1$;

transforming each per wheel average longitudinal velocity into a corresponding rear axle speed of the vehicle based on the following equation:

$$u_{raxle} = u * \cos(\delta_s) - \omega_z * l_{d2r}$$

where:

$u_{raxle}$ is a speed of each wheel at the rear axle;

$\delta_s$ is a road wheel angle of each wheel;

$\omega_z$ is a yaw rate of the vehicle; and $l_{d2r}$ is the distance from the corresponding wheel to the rear axle;

determining a linear longitudinal acceleration of the wheel sensor data originating from each of the plurality of wheels to compensate for differences between receiving the input data, including the vehicle sensor data from each of the plurality of sensors, based on the following equations:

$$u_{raxle}(t + \Delta t) = u_{raxle}(t) + a_{x_{linear}} * \Delta t$$

where:

$u_{raxle}$ is the speed of each of the plurality of wheels at the rear axle;

Δt is a predetermined time increment;

t is a specific point in time when the sensor measurement of the wheel sensor data originating from each of the plurality of wheels is received;

$a_{x_{linear}}$ is a linear acceleration of each of the plurality of wheels; and $$a_{x_{linear}} = a_x^{IMU} + \hat{b}_{a_{x_{linear}}} + g * \sin(\theta) - \omega_z^2 * l_{i2r} + \omega_z * \underline{u_{raxle}}$$

where:

$$u_{raxle}$$

is the speed of each wheel at the rear axle;

$a_{x_{linear}}$ is linear acceleration of each of the plurality of wheels;

$$\hat{b}_{a_{x_{linear}}}$$

is the bias of an inertial measurement unit (IMU) of the plurality of sensors;

$$a_x^{IMU}$$

is a sensor reading of the IMU;

g is the gravitational constant;

θ is a road bank;

$l_{i2r}$ is a distance from the IMU of the vehicle to the rear axle; and $\omega_z$ is the yaw rate of the vehicle;

filtering the input data, including the corrected wheel sensor data, with a sliding window Extended Kalman Filter (EKF) to determine a heading and a position of the vehicle, wherein filtering the input data comprises:

determining whether a distance accumulated by wheel pulses between a start time and an end time is greater than a distance threshold;

in response to determining that the distance accumulated by a plurality of wheel pulses between the start time and the end time is greater than the distance threshold, resetting a covariance of the sliding window EKF;

wherein the distance accumulated by the plurality of wheel pulses between the start time and the end time is determined using a following equation:

$$d_{whl}(t_s, t_e) = \frac{2 * \pi * R_{tire}}{N} * \Delta n(t_s, t_e)$$

where:

$t_s$ is a start time;

$t_e$ is an end time;

$d_{whl}(t_s, t_e)$ is the distance accumulated by the plurality of wheel pulses between the start time and the end time;

$R_{tire}$ is a radius of a tire of the vehicle;

π is a ratio of a circle's circumference to its diameter;

N is a number of wheel pulses per revolution;

$\Delta n(t_s, t_e)$ are a number of wheel pulse increments between a start time $t_s$ and an end time $t_e$; and controlling a movement of the vehicle using the heading and the position of the vehicle determined using the sliding window EKF.

20. The method of claim 19, wherein resetting the covariance of the sliding window EKF comprising includes determining a new covariance matrix using a following equation:

$$P_{new} = (I - K * H) * P_{old}$$

$P_{new}$ is the new covariance matrix of the sliding window EKF;

$P_{old}$ is a previous covariance matrix of the sliding window EKF;

I is an innovation matrix;

K is a Kalman gain matrix; and

H is a measurement matrix.

* * * * *